United States Patent
Molander et al.

(10) Patent No.: US 9,306,912 B2
(45) Date of Patent: Apr. 5, 2016

(54) BOOKMARKING SUPPORT OF TUNNELED ENDPOINTS

(71) Applicant: Lenovo Enterprise Solutions (Singapore) Pte. Ltd., Singapore (SG)

(72) Inventors: Mark E. Molander, Cary, NC (US); Michael H. Nolterieke, Raleigh, NC (US); David B. Roberts, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 276 days.

(21) Appl. No.: 14/016,738

(22) Filed: Sep. 3, 2013

(65) Prior Publication Data
US 2015/0067818 A1  Mar. 5, 2015

(51) Int. Cl.
*H04L 29/06* (2006.01)
*G06F 17/30* (2006.01)

(52) U.S. Cl.
CPC ........ *H04L 63/029* (2013.01); *G06F 17/30876* (2013.01); *H04L 2212/00* (2013.01)

(58) Field of Classification Search
CPC .............. H04L 63/029; H04L 63/0227; H04L 63/0272; H04L 29/1233; H04L 29/12339; H04L 29/12433; H04L 29/12462; H04L 29/1249; H04L 29/12575; H04L 2212/00; G06F 17/30884; G06F 17/30876
USPC .......................................................... 726/11
See application file for complete search history.

(56) References Cited

U.S. PATENT DOCUMENTS

| | | | |
|---|---|---|---|
| 5,778,381 A * | 7/1998 | Sandifer ...................... 701/29.1 |
| 7,177,901 B1 * | 2/2007 | Dutta ............................ 709/203 |
| 7,504,969 B2 | 3/2009 | Patterson et al. |
| 7,519,635 B1 | 4/2009 | Haustein et al. |
| 8,108,353 B2 | 1/2012 | Balachandran et al. |
| 8,140,491 B2 | 3/2012 | Mandagere et al. |
| 8,204,867 B2 | 6/2012 | Benhase et al. |
| 2001/0011285 A1 * | 8/2001 | Kanno et al. ................... 707/512 |
| 2004/0049737 A1 * | 3/2004 | Simon Hunt et al. ......... 715/513 |
| 2005/0180398 A1 * | 8/2005 | Deno et al. ..................... 370/352 |
| 2009/0204636 A1 | 8/2009 | Li et al. |

(Continued)

OTHER PUBLICATIONS

Costa, Lauro B., and Matei Ripeanu, "Towards Automating the Configuration of a Distributed Storage System," 11th IEEE/ACM International Conference on Grid Computing, IEEE, 2010, pp. 201-208.

(Continued)

*Primary Examiner* — Yogesh Paliwal
(74) *Attorney, Agent, or Firm* — Katherine S. Brown; Andrew M. Calderon; Roberts Mlotkowski Safran & Cole, P.C.

(57) ABSTRACT

Methods and systems for managing tunneled endpoints are provided. One method includes preventing a user from accessing an endpoint that was previously accessed by the user via a first URL including an address with a first port designation, creating a constructive bookmark to the previously accessed endpoint, and establishing a tunnel to the previously accessed endpoint based on the constructive bookmark. Another method includes preventing a user from bookmarking a URL to an endpoint. A system includes a processor coupled to a memory a module for managing tunneled endpoints that, when executed by the processor, cause the processor to perform one or more of the above methods.

20 Claims, 4 Drawing Sheets

(56) References Cited

U.S. PATENT DOCUMENTS

2012/0005745 A1* 1/2012 Wei et al. ........................ 726/15
2012/0191670 A1 7/2012 Kennedy et al.

OTHER PUBLICATIONS

Lillibridge et al., "Sparse Indexing: Large Scale, Inline Deduplication Using Sampling and Locality," Proc. of the 7th Conference on File and Storage Technologies, USENIX, 2009.

* cited by examiner

BOOKMARKING SUPPORT OF TUNNELED ENDPOINTS

BACKGROUND OF THE INVENTION

1. Field of the Invention

The present invention relates generally to computing systems, and more particularly to, systems and method for bookmarking support of tunneled endpoints.

2. Description of the Related Art

In computer networks, tunneling is a way for client computing devices to communicate with host computing systems that have restricted connectivity. Tunneling is generally performed by encapsulating one network protocol within another network protocol. In Internet applications, for example, various network protocols (e.g., the TCP/IP family of protocols) are usually encapsulated within the HTTP protocol so that the client computing device is able to bypass firewalls, network address translations (NATs), proxy servers, and/or other security features on the host computing device.

SUMMARY OF THE INVENTION

Various embodiments provide systems for managing bookmarking functions for tunneled endpoints. One system comprises a processor and a memory coupled to the processor. In one embodiment, the memory comprises a module for managing tunneled endpoints that, when executed by the processor, causes the processor to prevent a user from accessing an endpoint that was previously accessed by the user via a first URL including an address with a first port designation, create a constructive bookmark to the previously accessed endpoint, and establish a tunnel to the previously accessed endpoint based on the constructive bookmark.

Various other embodiments provide methods for managing tunneled endpoints. One method comprises preventing a user from accessing an endpoint that was previously accessed by the user via a first URL including an address with a first port designation, creating a constructive bookmark to the previously accessed endpoint, and establishing a tunnel to the previously accessed endpoint based on the constructive bookmark.

Another method comprises preventing a user from bookmarking a URL to an endpoint. In one embodiment, the user is prevented from bookmarking the endpoint by embedding a setting on the endpoint that is recognizable to a browser. The setting, in one embodiment, disables a bookmarking function in the browser, while, in another embodiment, the setting grays out a bookmarking function in the browser.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide systems and methods for managing tunneled endpoints. A system comprises a processor coupled to a memory comprising a module for managing tunneled endpoints that, when executed by the processor, cause the processor to perform one or more of the below methods. One method comprises preventing a user from bookmarking a URL to an endpoint. Another method comprises preventing a user from accessing an endpoint that was previously accessed by the user via a first URL including an address with a first port designation, creating a constructive bookmark to the previously accessed endpoint, and establishing a tunnel to the previously accessed endpoint based on the constructive bookmark.

Figure 1:
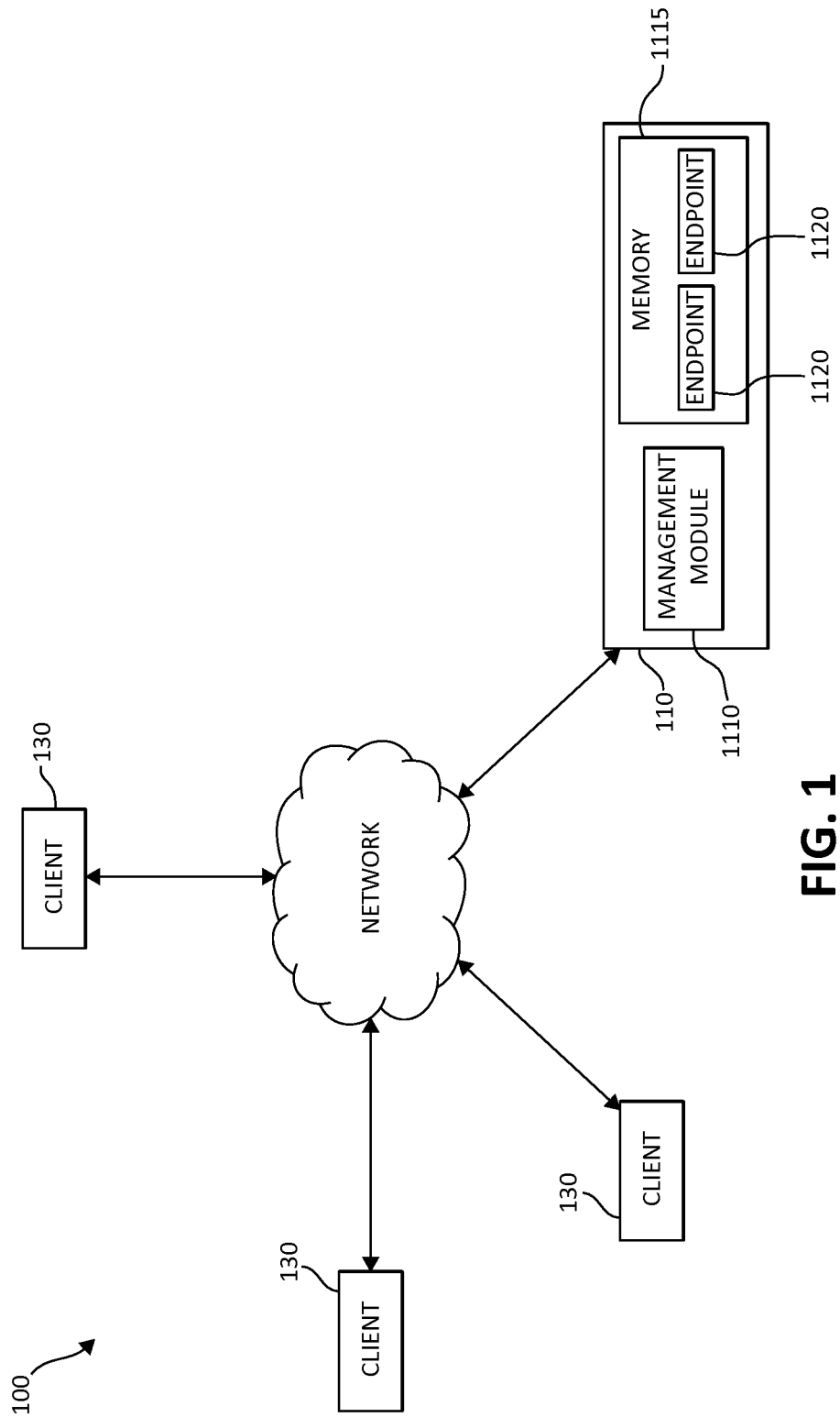
FIG. 1 is a block diagram of one embodiment of a system that manages the bookmarking of tunneled endpoints.

Turning now to the figures, FIG. 1 is a block diagram of one embodiment of a system 100 that manages the bookmarking of tunneled endpoints. At least in the illustrated embodiment, system 100 comprises a host computing device 110 (e.g., a server) coupled to a network 120 (e.g., the Internet, a local area network (LAN), a wide area network (WAN), storage area network (SAN), and/or the like networks), which is coupled to one or more client computing devices 130.

Host computing device 110 comprises a management module 1110 and a memory 1115 hosting one or more endpoints 1120 (e.g., one or more webpages, memory areas, etc.). Management module 1110, in one embodiment, is configured for preventing the client computing device(s) 130 from bookmarking one or more of the endpoints 1120. To prevent the endpoint(s) 1120 from being bookmarked, management module 1110, in one embodiment, sets a new flag in the response data sent to any client computing device 1130 gaining access to one or more of the endpoints 1120, even if access is gained via tunneling. The new flag is recognizable by the browser in the client computing device 130 and the new flag instructs the browser to "gray out" the browser option to bookmark the address to the endpoint 1120, disables the bookmark function in the browser for the address to any of the endpoints 1120, or other wise prevents the browser from bookmarking any endpoint address. In one embodiment, the flag instructs the browser to present a message/warning to the user that the endpoint address cannot be bookmarked and/or a message/warning that any bookmarking of the address will not function properly.

Figure 2:
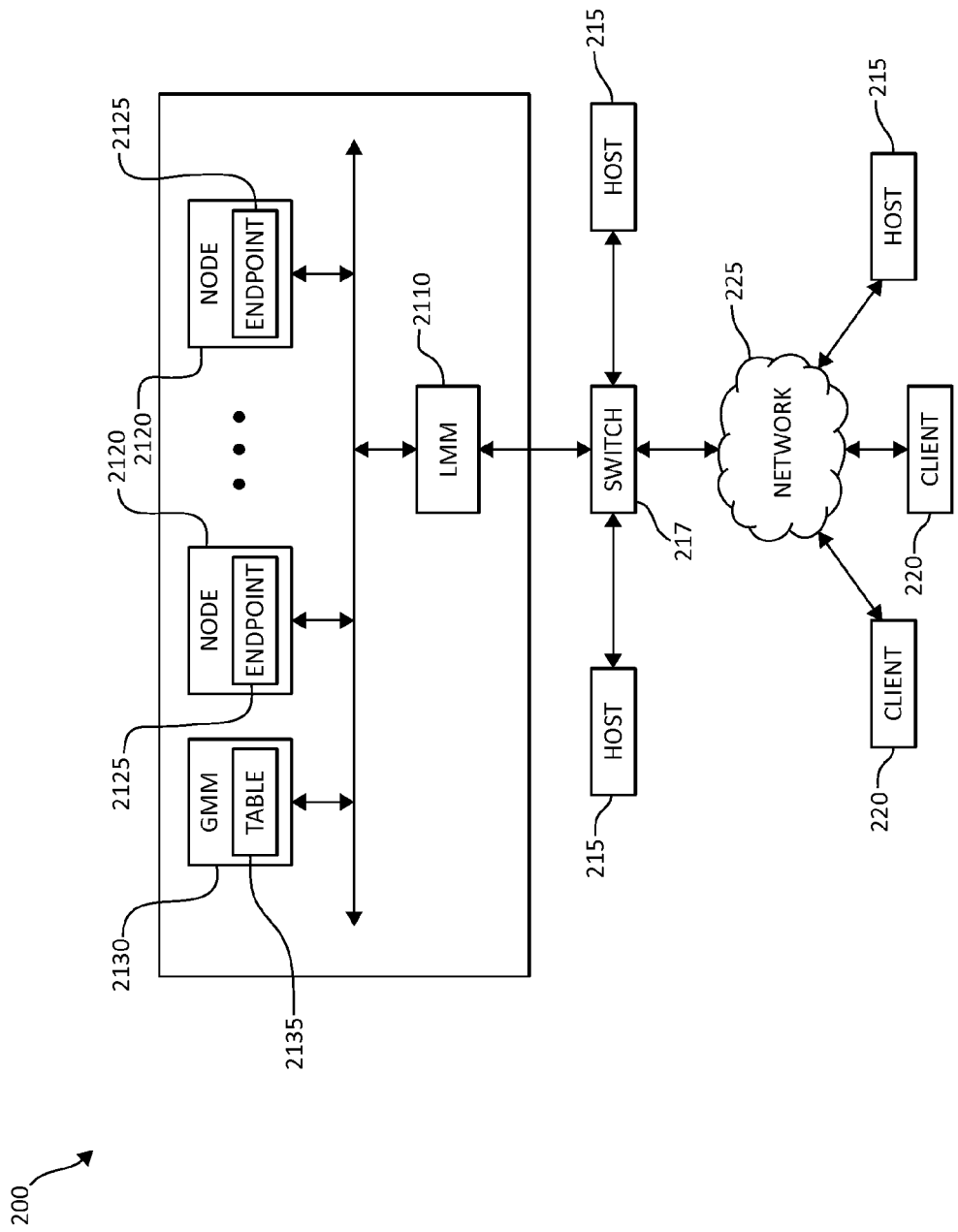
FIG. 2 is a block diagram of another embodiment of a system that manages the bookmarking of tunneled endpoints.

FIG. 2 is a block diagram of another embodiment of a system 200 that manages the bookmarking of tunneled endpoints. At least in the illustrated embodiment, system 200 comprises a host system 210 coupled to one or more other host devices 215 via a switch 217 and switch 217 is further coupled to one or more clients 220 and/or hosts 215 via a network 225.

Host system 210 comprises a local management module (LMM) 2110 coupled to one or more nodes 2120 and a global management module (GMM) 2130. LMM 2110 and node(s) 2120 may be any LMM and/or nodes known in the art or developed in the future. In one embodiment, one or more of nodes 2120 comprise an endpoint 2125 (e.g., hosts a webpage and/or similar application) and LMM 210 manages the input/output traffic to/from endpoint(s) 2125. Although FIG. 1 shows host system 210 comprising two nodes 2120, host system 210 may include a greater number of nodes 2120 or fewer nodes 2120.

Among other configurations, GMM 2130 is configured for managing bookmarking functions to endpoints 2125 when endpoints 2125 are accessed via tunneling. In one embodiment, when a user 220 accesses system 200 via, for example, a client 220, GMM 2130 is configured to validate/authenticate/identify the user/or client 220 so that GMM 2130 can associate the user and/or client 220 with bookmarking data included in table 2135, as discussed below. Validation/authentication can be performed utilizing any methods and/or techniques known in the art or developed in the future. For example, GMM 2130 may require a user and/or client to provide a password, passcode, digital signature, digital certificate, biometrics, and/or the like validation or authentication techniques when logging in to or accessing system 200.

In one embodiment, upon receipt of a request to access an endpoint (e.g., endpoint 2125), GMM 2130 is configured for preventing the address from being bookmarked by the requestor (e.g., client 220). To accomplish this, in one embodiment, GMM 2130 transmits a flag to client 220 in the response data. The flag is recognizable by a browser in client 220 and the flag instructs the browser to "gray out" the browser option to bookmark the address to endpoint 2125, disable the bookmark function in the browser for the address to endpoint 2125, or other wise prevents the browser from bookmarking the endpoint address. In one embodiment, the flag instructs the browser to present a message/warning to the user that the endpoint address cannot be bookmarked and/or a message/warning that any bookmarking of the address will not function properly.

In some instances, a user and/or client 220 may be able to bypass or circumvent the ability of GMM 2130 to prevent bookmarking of tunneled endpoints. In this situation and in instances where GMM 2130 may not prevent bookmarking of tunneled endpoints, GMM 2130 is configured for creating a constructive bookmark.

As illustrated in FIG. 2, GMM 2130 comprises and/or has access to a table 2135 (e.g., a look up table). Table 2135 is configured to track each time that a user and/or a client 220 accesses an endpoint 2125 and the port utilized to access each endpoint 2125. That is, each time an endpoint 2125 is accessed, the endpoint 2125 is accessed via a URL or address that includes a port number through which the endpoint 2125 is accessed and the port number utilized to access the endpoint 2125 is tracked in table 2135.

For example, a particular endpoint 2125 may have the URL https://1.2.3.4:######, where the number following the colon is the number of the port utilized to access the endpoint 2125. Thus, in the URL https://1.2.3.4:123456, port 123456 is the port number utilized to access the particular endpoint 2125. Therefore, when a user and/or client 220 accesses the particular endpoint 2125 utilizing the URL https://1.2.3.4:123456, table 2135 keeps track or maps that the user and/or client 220 accessed the particular endpoint 2125 utilizing port 123456. In other words, table 2135 tracks/maps an association between the user and/or client 220 and the port number utilized to access the particular endpoint 2125 each time the user and/or clients access the endpoint 2125.

In one embodiment, tunneling may be used by a user and/or client 220 to launch a browser to an endpoint 2125, even if the user and/or client 220 does not have a valid IP address for the endpoint 2125. In systems where GMM 2130 comprises the Flex System Manager™ (FSM) from IBM® Corporation of Armonk, N.Y., the port designations in the URL are used for tunneling. In these systems, the port used to access the endpoint 2125 randomly changes for every tunneled connection so that any attempt to connect with a previously accessed endpoint 2125 via a bookmark will fail because the access port will have changed in the subsequent connection. Since the access port randomly changes each time a user and/or client 220 accesses an endpoint 2125, bookmarking the URL is ineffective because the bookmarked URL includes the previous port number and the current and subsequent port number(s) are/will be different from the previous port number and subsequent access to the endpoint 2125 cannot be gained utilizing the previous port.

To enable a validated/authenticated user and/or client 220 to access an endpoint 2125 using a tunneled bookmark, GMM 2130, in various embodiments, is configured for creating a constructive bookmark. In one embodiment, GMM 2130 is configured for receiving a bookmarked request including a URL for an endpoint 2125. Since the port number for the tunneled bookmark is no longer valid because the access port changes each time the endpoint 2125 is accessed via tunneling, GMM 2130 is configured for modifying the port number in each URL that accesses the endpoint 2125 via tunneling. GMM 2130 is further configured to track, via table 2135, the port number in the modified URL so that the port number is not utilized in a subsequent request to access the endpoint 2125. If the URL includes a port number that has not been previously utilized by the user and/or client 220, GMM 2130 allows access to the endpoint 2125.

The following example may be helpful in understanding some aspects of the functionality of GMM 2130; however, the invention is not limited to such example. In this example, GMM 2130 receives a request from a user to access an endpoint 2125 via the tunneled URL https://9.8.7.6:987654. Upon receipt of the request, GMM 2130 validates/authenticates the user and/or client 220 and checks table 2135 to determine if the user and/or client 220 have accessed the endpoint 2125 utilizing port 987654. If the user and/or client have not accessed the endpoint 2125 utilizing the port in the URL, GMM 2130 associates the port number with the user and/or client 220 in table 2135 and enables the user and/or client 220 to access the endpoint 2125.

If GMM 2130 determines, via table 2135, that port 987654 was previously utilized by the user and/or client 220 to access the endpoint 2125 at address https://9.8.7.6 (i.e., the URL https://9.8.7.6:987654 is a bookmarked URL), GMM 2130 modifies the address https://9.8.7.6:987654 to include a port number that the user and/or client 220 has not utilized in the past to access the endpoint 2125 located at the URL https://9.8.7.6. In this example, supposing that the user and/or client 220 has previously accessed the endpoint 2125 located at the URL https://9.8.7.6 using port 987654 (i.e., the bookmarked URL https://9.8.7.6:987654) and port 123456 (i.e., a first modification of the bookmarked URL (https://9.8.7.6:123456)), GMM 2130 will modify the bookmarked URL (i.e. https://9.8.7.6:987654) in the latest request to include a port number that is different from 987654 and 123456. That is, the modified URL may be, for example, any URL in the range of https://9.8.7.6:000000 to https://9.8.7.6:999999 except for https://9.8.7.6:987654 and https://9.8.7.6:123456. Remembering that the port is randomly assigned, a URL modified by GMM 2130 in a subsequent request to access the endpoint 2125 using the bookmarked URL https:/9.8.7.6:987654 may be, for example, https://9.8.7.6:285904, which is tracked in table 2135 so that the bookmarked URL https://9.8.7.6:987654 is not modified to the URL https:/9.8.7.6:285904 when the user and/or client 220 subsequently attempts to access the endpoint located at address https://9.8.7.6 with the bookmarked URL. GMM 2130 will perform these functions each time that the user and/or client 220 attempts to access the endpoint 2125 at located at the URL https://9.8.7.6 utilizing the bookmarked URL.

Host system(s) 215 is/are similar to host system 210 except that host system(s) 215 does/do not include GMM 2130. Here, GMM 2130 in host system 210 performs the same functions for some or all of the endpoints residing in host system(s) 215 as GMM 2130 performs for the endpoints 2125 residing in nodes 2120 of host system 210. That is, GMM 2130 may manage tunneled bookmarked access to endpoints (i.e., endpoints 2125) residing in the host system 210 in which GMM 2130 resides and/or in endpoints residing in another host computing system (i.e., host computing system(s) 215) in communication with GMM 2130.

Network 225 may be any type of network known in the art developed in the future. Examples of network 225 include, but are not limited to, the Internet, LANs, WANs, SANs, and the like networks. While FIG. 2 illustrates that network 225 is a network that combines both management and data functions, various other embodiments of the invention (see FIG. 3) include different networks for management functions and data functions. That is, the embodiment shown in FIG. 3 includes a management network 2253 and a data network 2257.

Figure 3:
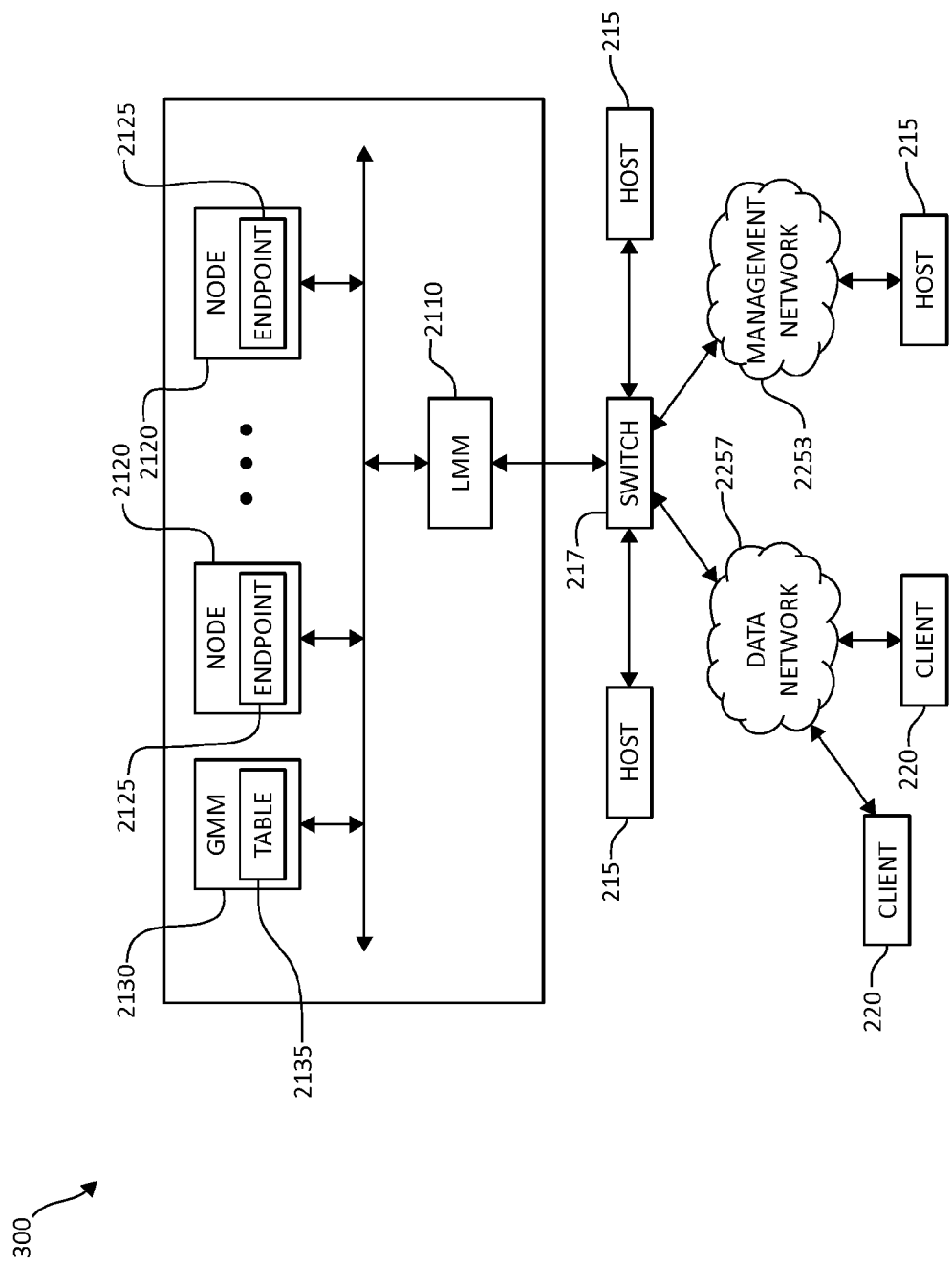
FIG. 3 is a block diagram of yet another embodiment of a system that manages the bookmarking of tunneled endpoints.

In the embodiment illustrated in FIG. 3, the user utilizes the data network 2257 to access the endpoints 2125 in the various host computing systems (i.e., host system 210 and host system(s) 215) and GMM 2130 utilizes the management network to perform the various tunneled bookmarking functions for the endpoint(s) 2125 residing in the host system(s) 215 discussed above.

Figure 4:
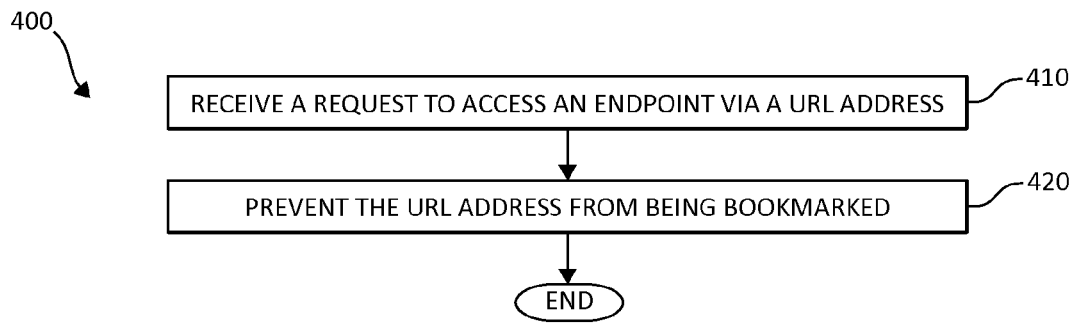
FIG. 4 is a flow diagram of one embodiment of a method for managing the bookmarking of tunneled endpoints.

FIG. 4 is a flow diagram of one embodiment of a method 400 for managing the bookmarking of tunneled endpoints. At least in the illustrated embodiment, method 400 begins by receiving, by a GMM (e.g., GMM 2130), a request to access an endpoint (e.g., endpoint 2125), the request including a URL address to the endpoint (block 410). Method 400 further comprises the GMM preventing the URL from being bookmarked by the requestor (block 420). In one embodiment, the GMM transmits a flag in the response data sent to the requestor. The flag is recognizable by a browser in the requestor and the flag instructs the browser to "gray out" the browser option to bookmark the address to the endpoint, disable the bookmark function in the browser for the address to the endpoint, or other wise prevents the browser from bookmarking the endpoint address. In one embodiment, the flag instructs the browser to present a message/warning to the user that the endpoint address cannot be bookmarked and/or a message/warning that any bookmarking of the address will not function properly.

Figure 5:
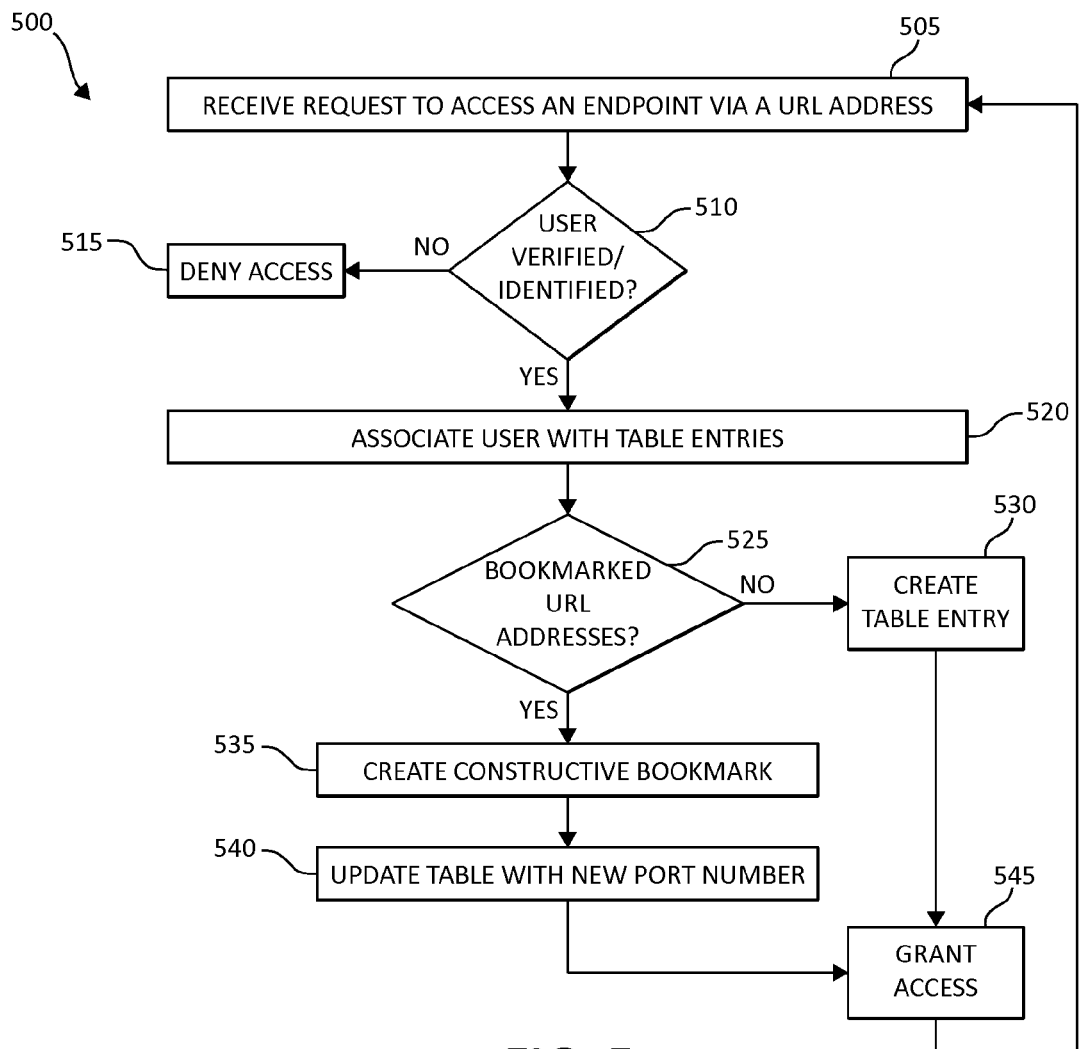
FIG. 5 is a flow diagram of another embodiment of a method for managing the bookmarking of tunneled endpoints.

FIG. 5 is a flow diagram of one embodiment of a method 500 for managing the bookmarking of tunneled endpoints. At least in the illustrated embodiment, method 500 begins by receiving a request to access an endpoint (e.g., endpoint 2125) (block 505).

Method 500 then verifies/identifies the user (block 510). If the user cannot be verified and/or identified, the user is denied access to the endpoint (block 515). Once verified and/or identified, method 500 includes associating the user and/or client with entries in a table (e.g., table 2135) (block 520).

The table is checked to determine if the user and/or client has accessed the endpoint utilizing a bookmarked URL address (block 525). Since a bookmarked address will include the same port number in the URL address as a previous request, method 500 checks the table to see if the user has used the port number included in the current request to access the endpoint as a previous request to access the endpoint.

If the user and/or client has not previously utilized the port number in the current request to access the endpoint, method 500 includes creating an entry in the table associating the user and/or client with the port number in the URL address of the current request (block 530). Method 500 then grants the user/client access to the endpoint (block 545) and method 500 can begin again for another request to access an endpoint (block 505).

If the user and/or client have previously utilized the port number in the current request to access the endpoint, method 500 includes creating a constructive bookmark for this request to access the endpoint (block 545). In one embodiment, modifying the URL address in the current request to include a new port number creates the constructive bookmark. That is, the modified URL address includes a new port designation, which is different than any port number used in any previous request issued by the user and/or client. That is, the table is utilized to ensure that the same port number is not used more than once when the user and/or client attempt to access the endpoint.

Method 500 also comprises updating the table to include the port number in the URL address of the current request (block 540). Method 500 then grants the user/client access to the endpoint (block 545) and method 500 can begin again for another request to access an endpoint (block 505).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical processor, a magnetic processor, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for managing tunneled endpoints, comprising:
a processor; and
a memory coupled to the processor, the memory comprising a module for managing tunneled endpoints that, when executed by the processor, causes the processor to:
keep track, via a table in the module, of each endpoint that a user accesses;
prevent the user from accessing an endpoint that was previously accessed by the user via a first URL including an address with a first port designation, based upon information stored in the table indicating that the user previously accessed the endpoint,
create a constructive bookmark to the previously accessed endpoint, and
establish a tunnel to the previously accessed endpoint based on the constructive bookmark.

2. The system of claim 1, wherein creating the constructive bookmark comprises creating a different URL, the different URL including the address with a second port designation that is different than the first port designation.

3. The system of claim 2, wherein establishing the tunnel comprises utilizing a different port to access the previously accessed endpoint based on the different port designation.

4. The system of claim 1, wherein the module causes the processor to prevent the user from bookmarking a URL to the endpoint.

5. The system of claim 4, wherein preventing the user from bookmarking the URL comprises embedding a setting in a browser that disables a bookmarking function in the browser.

6. The system of claim 1, wherein the module causes the processor to receive the first URL from the user; and wherein creating the constructive bookmark comprises modifying the first URL to include a second port designation that is different than the first port designation.

7. A system for managing tunneled endpoints, comprising:
a processor; and
a memory coupled to the processor, the memory comprising a module for managing tunneled endpoints that, when executed by the processor, causes the processor to:
prevent a user from accessing an endpoint that was previously accessed by the user via a first URL including an address with a first port designation,
create a constructive bookmark to the previously accessed endpoint, and
establish a tunnel to the previously accessed endpoint based on the constructive bookmark,
wherein creating the constructive bookmark comprises creating a different URL, the different URL including the address with a second port designation that is different than the first port designation, and
wherein the module comprises a table, the module further causing the processor to:
keep track, via the table, of each endpoint that the user accesses;

map, via the table, each port that is utilized to access each endpoint to ensure that a different port is utilized to access the previously accessed endpoint.

8. The system of claim 7, wherein the module causes the processor to:
    determine a validity of the user; and
    in response to validating the user, associate the user with entries related to the user kept in the table.

9. A method for managing tunneled endpoints, comprising:
    keeping track, via a table in a memory, of each endpoint a user accesses;
    preventing, via a processor, the user from accessing an endpoint that was previously accessed by the user, via a first URL including an address with a first port designation, based upon information stored in the table indicating that the user previously accessed the endpoint;
    creating a constructive bookmark to the previously accessed endpoint; and
    establishing a tunnel to the previously accessed endpoint based on the constructive bookmark.

10. The method of claim 9, wherein creating the constructive bookmark comprises creating a different URL, the different URL including the address with a second port designation that is different than the first port designation.

11. The method of claim 10, wherein establishing the tunnel comprises utilizing a different port to access the previously accessed endpoint based on the different port designation.

12. The method of claim 9, further comprising preventing the user from bookmarking a URL to the endpoint.

13. The method of claim 12, wherein preventing the user from bookmarking the URL comprises embedding a setting in a browser that disables a bookmarking function in the browser.

14. The method of claim 9, further comprising receiving the first URL from the user, wherein creating the constructive bookmark comprises modifying the first URL to include a second port designation that is different than the first port designation.

15. A method for managing tunneled endpoints, comprising:
    preventing, via a processor, a user from accessing an endpoint that was previously accessed by the user via a first URL including an address with a first port designation;
    creating a constructive bookmark to the previously accessed endpoint; and
    establishing a tunnel to the previously accessed endpoint based on the constructive bookmark,
    wherein creating the constructive bookmark comprises creating a different URL, the different URL including the address with a second port designation that is different than the first port designation,
    the method further comprising:
    tracking, via a table, each endpoint that the user accesses;
    mapping, via the table, each port that is utilized to access each endpoint to ensure that a different port is utilized to access the previously accessed endpoint.

16. The method of claim 15, further comprising:
    determining a validity of the user; and
    in response to validating the user, associating the user with entries related to the user kept in the table.

17. A method for managing tunneled endpoints comprising:
    keeping track, via a table in a memory, of each endpoint accessed by a user; and
    preventing the user, via a processor, from bookmarking a URL to an endpoint that was previously accessed by the user, based upon information stored in the table indicating that the user previously accessed the endpoint.

18. The method of claim 17, wherein preventing the user from bookmarking the URL comprises embedding a setting on the endpoint, the setting recognizable to a browser.

19. The method of claim 18, wherein the setting disables a bookmarking function in the browser.

20. The method of claim 18, wherein the setting grays out a bookmarking function in the browser.

* * * * *